United States Patent [19]

Briggs

[11] Patent Number: 4,553,897

[45] Date of Patent: Nov. 19, 1985

[54] FLOAT MEANS FOR CONNECTING THE WINCH LINE OF A BOAT TRAILER TO A BOAT

[76] Inventor: Thomas V. Briggs, 1368 Ranier, Canton, Mich. 48187

[21] Appl. No.: 620,682

[22] Filed: Jun. 14, 1984

[51] Int. Cl.⁴ .............................................. B60P 1/04
[52] U.S. Cl. .................................. 414/559; 114/344; 280/414.1
[58] Field of Search ............... 414/494, 506, 538, 559; 114/344; 280/414.1

[56] References Cited

U.S. PATENT DOCUMENTS 2,571,361 10/1951 Harmanson .................... 414/559 X
3,091,352 5/1963 Vitable ............................. 414/559

*Primary Examiner*—Robert G. Sheridan
*Attorney, Agent, or Firm*—Charles W. Chandler

[57] ABSTRACT

A boat trailer having a winch at its forward end, and a pivotal rod at its rearward end with a float on the rod for raising it from a generally horizontal position toward an upright position as the trailer is backed into the water. The rod has an eye for engaging a hook on the winch line to support it for a user in a boat to connect the line to the bow of the boat.

3 Claims, 4 Drawing Figures

FLOAT MEANS FOR CONNECTING THE WINCH LINE OF A BOAT TRAILER TO A BOAT

BACKGROUND OF THE INVENTION

This invention is related to boat trailers having a winch with a line that is connected to a boat to pull it on the trailer.

Boat trailers are commonly used for transporting a boat to and from a body of water. Usually the trailer is backed down a ramp into the water to a position in which the boat can float. The boat is then released from the trailer. Usually the connection between the boat and the trailer is a line connected to a winch on the trailer and carrying a hook that is engaged with an eye in the bow of the boat.

To retrieve the boat, usually a person will walk down the trailer which often is slippery because the lower end is in the water, until he can connect the winch line to the boat. He then winches the boat onto the trailer.

There are several problems with this arrangement. For example, the user frequently does not know whether the lower, submerged end of the trailer is at a sufficient depth in the water to accommodate the boat. This is a function of the slope of the ramp and the length of the trailer. In addition, it is sometimes dangerous for a person attempting to connect the winch line to a boat because he has to wade into the water as he walks along the trailer.

SUMMARY OF THE INVENTION

The broad purpose of the present invention is to provide means for assisting a boat user in connecting a winch line to a boat without having to wade into the water as well as providing means for assisting the user in positioning the lower end of the trailer in the water as he backs the trailer down a ramp. The preferred embodiment of the invention comprises a rod with a float mounted at the rearward end of the trailer. The rod is pivotal so that as the trailer is backed into the water the float causes the rod to move from a generally horizontal position to an upright position. The float is adjustable along the length of the rod to indicate the depth of the trailer when the rod is upright when the float is at the surface of the water it will indicate that the trailer is at the proper depth.

The upper end of the rod has an eye for receiving the winch line hook.

In launching a boat, the trailer is backed down a ramp until the boat is capable of being released from the trailer. The user in the boat then releases the hook from the eye on the boat, and connects it to the eye on the rod.

When the boater returns, he disconnects the winch line from the rod and connects the hook to the boat. The boat can then be winched safely up onto the trailer without anyone having to wade into the water.

Still further objects and advantages of the invention will become readily apparent to those skilled in the art to which the invention pertains upon reference to the following detailed description.

DESCRIPTION OF THE PREFERRED EMBODIMENT

Figure 1:
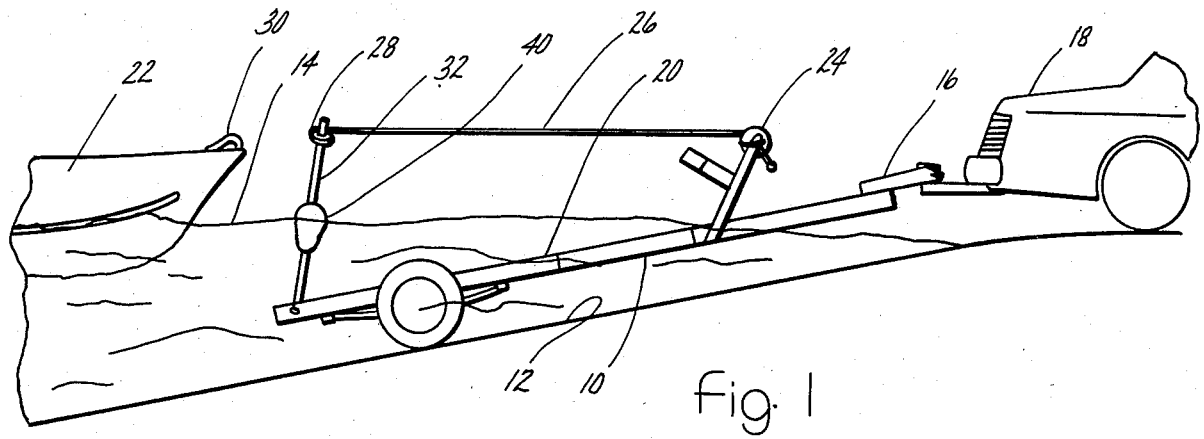
FIG. 1 illustrates a boat trailer backed down a ramp with a winch line supported on a rod in accordance with the invention.

Referring to the drawing, FIG. 1 illustrates a wheeled boat trailer 10 being backed down ramp 12 into water 14. The forward end of the trailer has hitch means 16 for connecting a towing vehicle 18. The trailer has a frame 20 for supporting boat 22.

Winch means 24 is mounted on the forward end of the boat and is connected to winch line 26. Hook 28 is connected to the free end of the line.

Boat 22 has an eye 30 for receiving hook 28.

Figure 2:
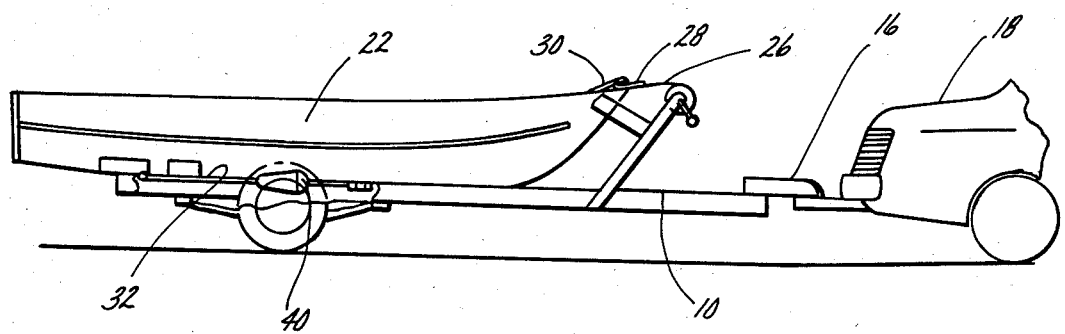
FIG. 2 is a view similar to FIG. 1 but showing the boat mounted on the trailer.
Figure 3:
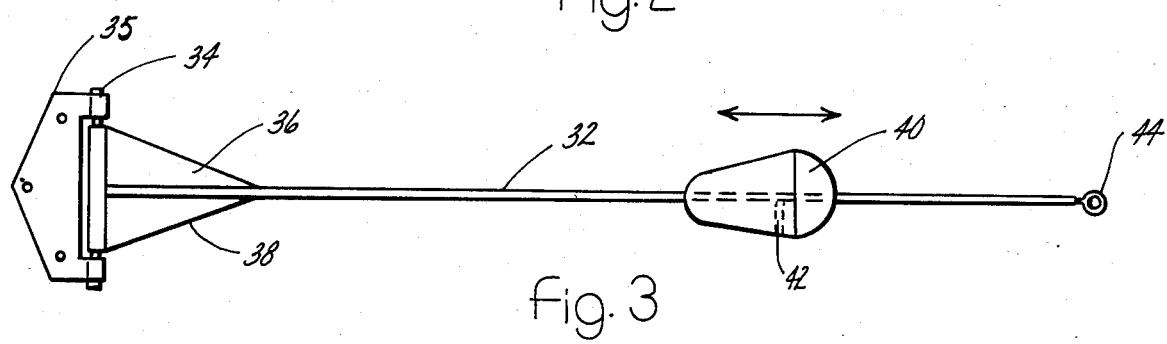
FIG. 3 is an enlarged view of the rod and float.
Figure 4:
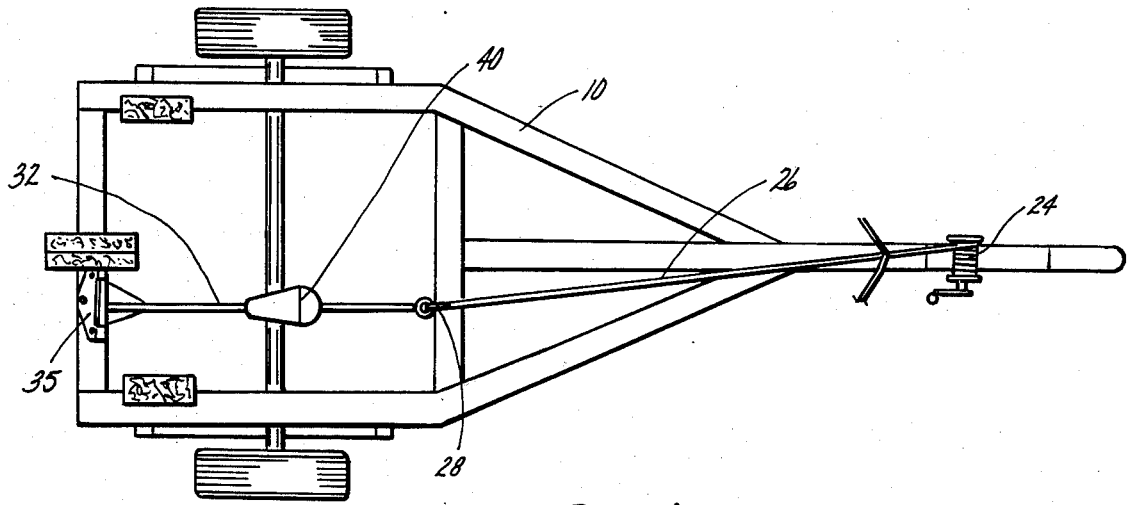
FIG. 4 is a plan view of the trailer.

Rod 32 is pivotally mounted by swivel means 34 to bracket 35 mounted at the rear centerline of the boat frame. The rod is movable from a generally horizontal position illustrated in FIG. 2, and an upright, generally vertical position, illustrated in FIG. 1.

The base of the rod has a pair of fins 36 and 38 to provide rigidity.

Float 40 is slideably mounted on the rod.

Fastener means 42 provide means for locking the float at an adjusted position along the length of the rod.

The upper end of the rod has an eye 44 adapted to receive hook 28.

In use, the rod is raised by the float as the boat trailer is backed down ramp 12. By viewing the rod as he backs the trailer down the ramp, the user can determine when the rod is in its vertical position that the rear end of the trailer is at a sufficient depth to accept boat 22. The rod is locked in an adjusted position depending upon the depth of the water.

After the user backs the boat off the trailer, he disconnects the hook from eye 30 on the boat and then connects it to eye 44 on the rod. This enables him, upon returning to the trailer, to hook the winch line to the boat without having to manually pull the line from the winch, as well as eliminating the necessity of walking on the empty trailer which is usually wet and slippery and half under water.

Having described my invention, I claim:

1. A boat loading structure for a boat having eye means at one end thereof, comprising:
   a boat trailer adapted to be coupled to a towing vehicle, and having a forward end and a rearward end;
   a rod and means mounting the rod on the trailer for motion from a lower position to a generally upright position;
   a float member mounted on the rod to cause it to move from said lower position toward said upright position as the trailer is moved into a body of water for receiving a boat; and
   winch means at the forward end of the trailer including a line mounted on the winch means, the line having hook means for engaging the eye of the boat and means on the rod for engaging the hook means so that a user in a boat floating in the water can disengage the hook means from the rod to connect it to the boat eye.

2. A combination as defined in claim 1, in which the float is adjustable along the rod to a selected position.

3. A combination as defined in claim 1, including pivot means for connecting the rod to the boat trailer.

* * * * *